(12) United States Patent
Chen et al.

(10) Patent No.: US 12,419,416 B2
(45) Date of Patent: *Sep. 23, 2025

(54) SLIDE RAIL ASSEMBLY AND SLIDE RAIL THEREOF

(71) Applicants: King Slide Works Co., Ltd., Kaohsiung (TW); King Slide Technology Co., Ltd., Kaohsiung (TW)

(72) Inventors: Ken-Ching Chen, Kaohsiung (TW); Shun-Ho Yang, Kaohsiung (TW); Chih-Hsin Yeh, Kaohsiung (TW); Chun-Chiang Wang, Kaohsiung (TW)

(73) Assignees: King Slide Works Co., Ltd., Kaohsiung (TW); King Slide Technology Co., Ltd., Kaohsiung (TW)

( * ) Notice: Subject to any disclaimer, the term of this patent is extended or adjusted under 35 U.S.C. 154(b) by 124 days.

This patent is subject to a terminal disclaimer.

(21) Appl. No.: 18/495,006

(22) Filed: Oct. 26, 2023

(65) Prior Publication Data

US 2024/0324771 A1   Oct. 3, 2024

(30) Foreign Application Priority Data

Mar. 27, 2023   (TW) .................. 112111853

(51) Int. Cl.
*A47B 88/487*   (2017.01)
*A47B 88/493*   (2017.01)

(52) U.S. Cl.
CPC .......... *A47B 88/487* (2017.01); *A47B 88/493* (2017.01); *A47B 2210/0035* (2013.01)

(58) Field of Classification Search
CPC ....... A47B 88/10; A47B 88/14; A47B 88/487; A47B 88/493; A47B 2210/0032; A47B 2210/0035
See application file for complete search history.

(56) References Cited

U.S. PATENT DOCUMENTS

| | | | | |
|---|---|---|---|---|
| 3,451,730 A * | 6/1969 | Thomas | ............... | A47B 88/493 384/18 |
| 4,787,756 A * | 11/1988 | Pilarski | ................ | B60N 2/0715 384/47 |
| 4,921,359 A * | 5/1990 | Sakamoto | ............... | F16C 29/04 312/334.17 |
| 5,522,665 A * | 6/1996 | Baloche | ............... | B60N 2/0715 384/34 |
| 5,692,839 A * | 12/1997 | Rohee | ..................... | F16C 29/04 384/47 |
| 6,056,379 A * | 5/2000 | Weng | ................... | A47B 88/493 312/334.17 |

(Continued)

FOREIGN PATENT DOCUMENTS

| | | | |
|---|---|---|---|
| CN | 200994581 Y | * | 12/2007 |
| CN | 201721351 U | * | 1/2011 |

(Continued)

*Primary Examiner* — Andrew Roersma
(74) *Attorney, Agent, or Firm* — Best & Flanagan LLP

(57) ABSTRACT

A slide rail assembly includes at least two slide rails. One of the two slide rails includes a pair of walls and a middle wall connected between the pair of walls. The middle wall of the slide rail is arranged with a predetermined part bent relative to the middle wall, and the predetermined part is formed with a ball groove.

7 Claims, 2 Drawing Sheets

(56) References Cited

U.S. PATENT DOCUMENTS

| | | | | |
|---|---|---|---|---|
| 6,378,968 | B1 * | 4/2002 | Weng | A47B 88/493 |
| | | | | 312/334.17 |
| 9,894,993 | B2 | 2/2018 | Chen et al. | |
| 10,486,557 | B2 | 11/2019 | Sportelli | |
| 2024/0324767 | A1 * | 10/2024 | Chen | B60N 2/0702 |

FOREIGN PATENT DOCUMENTS

| | | | | | |
|---|---|---|---|---|---|
| CN | 202088919 | U | * | 12/2011 | |
| CN | 104354612 | A | | 2/2015 | |
| CN | 103538496 | B | * | 9/2016 | |
| DE | 3323195 | A1 | * | 1/1985 | |
| DE | 3741427 | A1 | | 6/1989 | |
| EP | 0774375 | A2 | | 5/1997 | |
| FR | 2286723 | A1 | * | 4/1976 | |
| FR | 2380462 | A1 | | 9/1978 | |
| GB | 2061705 | A | * | 5/1981 | |
| GB | 2215994 | A | | 10/1989 | |
| JP | H01-95135 | U | | 6/1989 | |
| JP | H06278508 | A | | 10/1994 | |
| JP | 2018-177209 | A | | 11/2018 | |
| KR | 1020070031663 | A | * | 3/2007 | |
| KR | 1020080077712 | A | * | 8/2008 | |
| KR | 1020170057630 | A | * | 5/2017 | |
| WO | WO-2012007351 | A1 | * | 1/2012 | A47B 88/493 |

* cited by examiner

SLIDE RAIL ASSEMBLY AND SLIDE RAIL THEREOF

BACKGROUND OF THE INVENTION

1. Field of the Invention

The present invention relates to a slide rail mechanism, and more particularly, to a slide rail assembly capable of improving structural strength and a slide rail thereof.

2. Description of the Prior Art

U.S. Pat. No. 9,894,993 B2 discloses a three-section slide rail assembly with enhanced supporting capability, which includes a first rail, a second rail and a third rail. The first rail has a first longitudinal body extended with a pair of first arms from both sides of the first longitudinal body. A first passage is defined by the pair of first arms and the first longitudinal body. Each of the first arms has a first ball raceway located in the first passage. The second rail is movable relative to the first passage of the first rail. The second rail has a second longitudinal body extended with a pair of second arms from both sides of the second longitudinal body. A second passage is defined by the pair of second arms and the second longitudinal body. Each of the second arms has a first arm section and a second arm section. The first arm section has a second inner ball raceway, and the second arm section has a second outer ball raceway. The third rail is movable relative to the second passage of the second rail. The third rail has a third longitudinal body extended with a pair of longitudinal supporting structures from both sides of the third longitudinal body. Each of the supporting structures comprises a first supporting arm and a second supporting arm. One of the first supporting arm and the second supporting arm has a third ball raceway facing toward the second inner ball raceway of the second rail.

However, in order to meet diverse requirements of the market, it is important to develop various products.

SUMMARY OF THE INVENTION

The present invention relates to a slide rail assembly capable of improving structural strength and a slide rail thereof.

According to an embodiment of the present invention, a slide rail assembly comprises a first rail, a slide assisting device and a second rail. The first rail comprises a first wall, a second wall and a first middle wall connected between the first wall and the second wall. A passage is defined by the first wall, the second wall and the first middle wall. The slide assisting device is arranged in the passage of the first rail, and the slide assisting device comprises a first rolling member. The second rail is movable relative to the first rail. The second rail comprises a third wall, a fourth wall and a second middle wall connected between the third wall and the fourth wall. The first middle wall of the first rail is arranged with a first predetermined part bent relative to the first middle wall. The first predetermined part is formed with a first ball groove. The second rail further comprises a first extension wall. The first extension wall comprises a first extension section, a second extension section and a first middle section connected between the first extension section and the second extension section. The first extension section is extended from the third wall of the second rail, and the first middle section is formed with a second ball groove. The first rolling member is located between the first ball groove and the second ball groove.

According to another embodiment of the present invention, a slide rail comprises a first wall, a second wall and a middle wall connected between the first wall and the second wall. The middle wall of the slide rail is arranged with a first predetermined part bent relative to the middle wall. The first predetermined part is formed with a ball groove.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
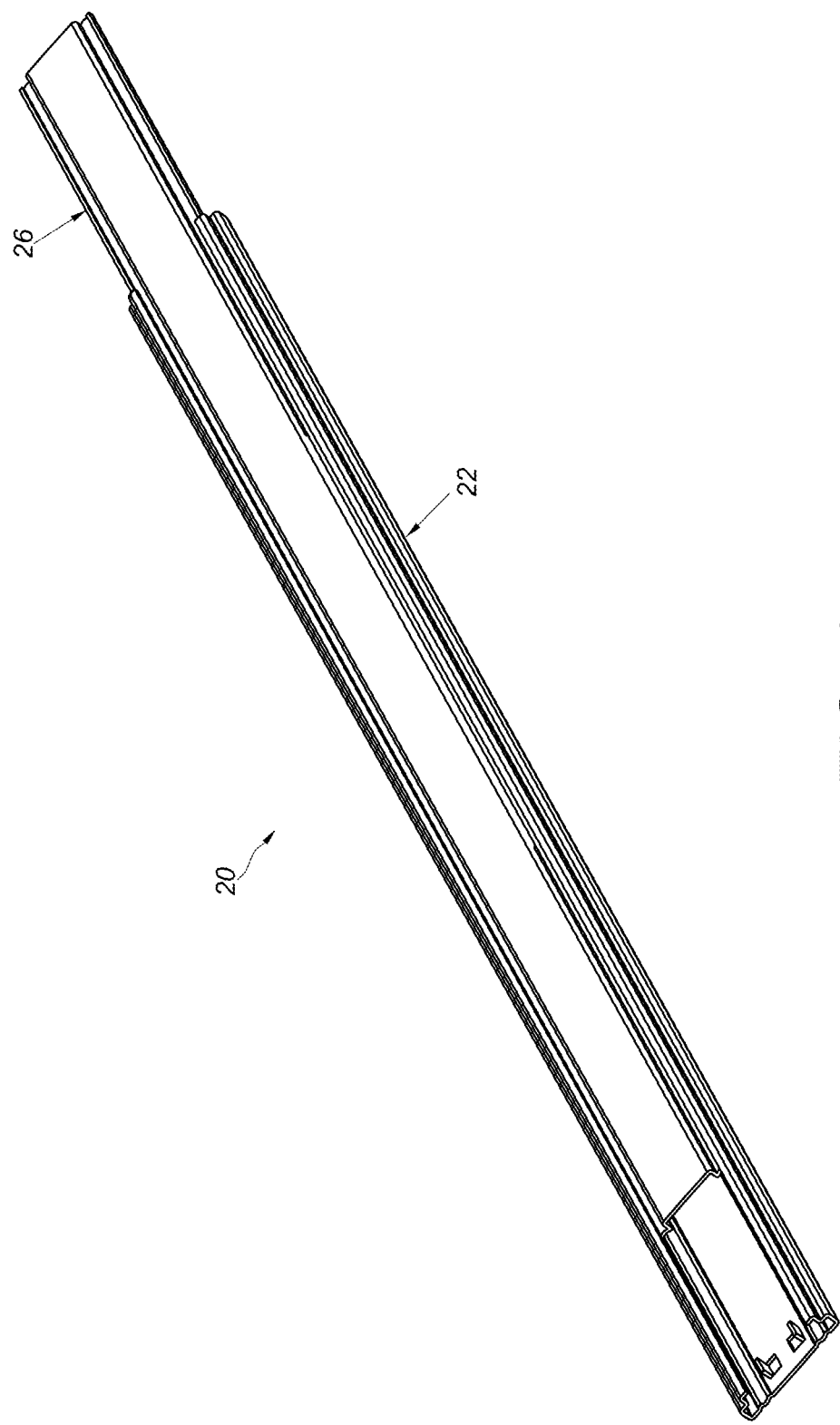
FIG. 1 is a diagram showing a slide rail assembly according to an embodiment of the present invention.
Figure 2:
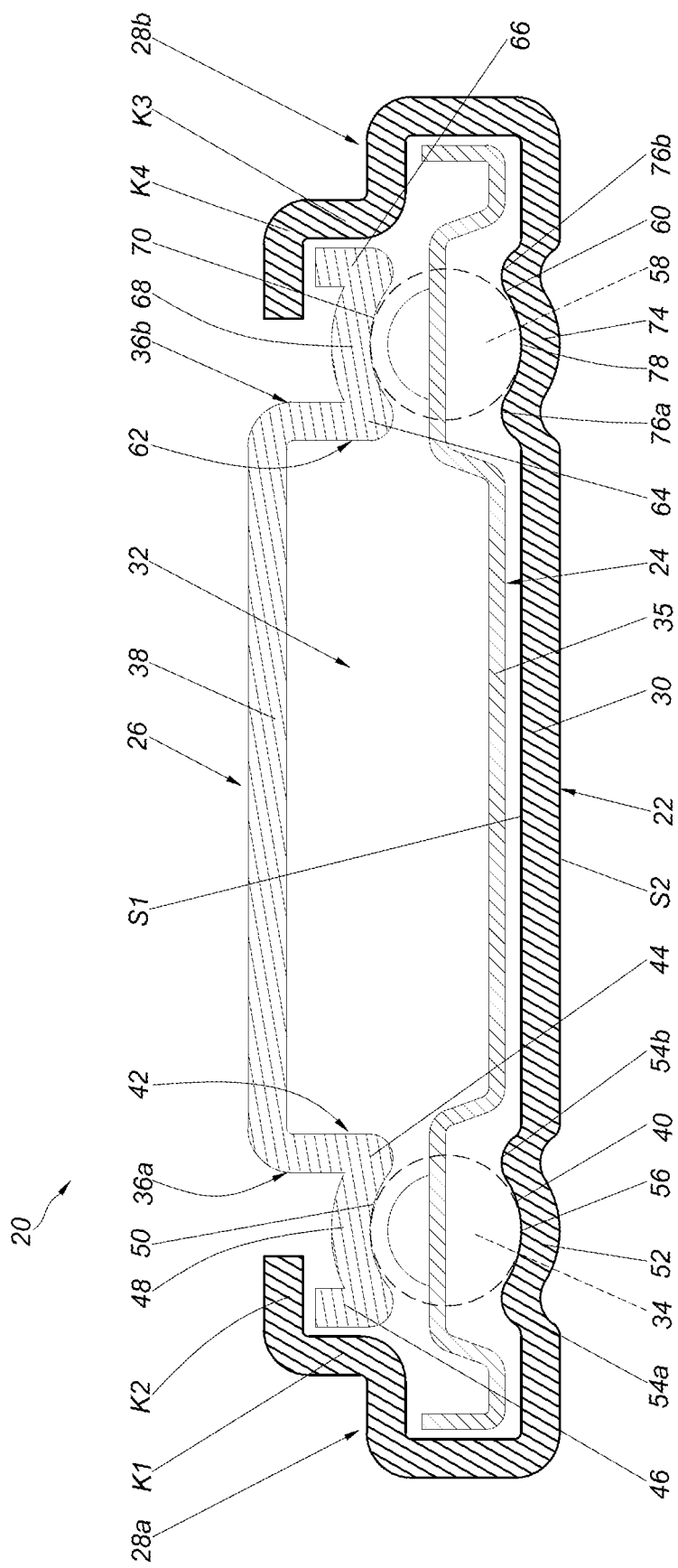
FIG. 2 is a cross-sectional view of the slide rail assembly according to the embodiment of the present invention.

As shown in FIG. 1 and FIG. 2, a slide rail assembly 20 comprises a first rail 22, a slide assisting device 24 and a second rail 26 according to an embodiment of the present invention. For example, the first rail 22 is an outer rail, and the second rail 26 is an inner rail.

The first rail 22 comprises a first wall 28a, a second wall 28b and a first middle wall 30 connected between the first wall 28a and the second wall 28b. A passage 32 is defined by the first wall 28a, the second wall 28b and the first middle wall 30.

The slide assisting device 24 is arranged in the passage 32 of the first rail 22. The slide assisting device 24 comprises a first rolling member 34. In the present embodiment, the first rolling member 34 is a ball, but the present invention is not limited thereto. Preferably, the slide assisting device 24 further comprises a retainer 35 configured to mount the first rolling member 34.

The second rail 26 is movable relative to the first rail 22, and the second rail 26 comprises a third wall 36a, a fourth wall 36b and a second middle wall 38 connected between the third wall 36a and the fourth wall 36b.

The first middle wall 30 of the first rail 22 is arranged with a first predetermined part 52 bent relative to the first middle wall 30. For example, the first predetermined part 52 is substantially arranged in an arc shape. The first predetermined part 52 has a first ball groove 40, and the second rail 26 further comprises a first extension wall 42. The first extension wall 42 comprises a first extension section 44, a second extension section 46 and a first middle section 48 connected between the first extension section 44 and the second extension section 46. The first extension section 44 is extended from the third wall 36a of the second rail 26, and the first middle section 48 comprises a second ball groove 50. The first rolling member 34 is located between the first ball groove 40 and the second ball groove 50.

The first predetermined part 52 is adjacent to the first wall 28a of the first rail 22. The first middle section 48 of the second rail 26 has an arc contour. In the present embodiment, the first rolling member 34 is in contact between the first ball groove 40 and the arc contour of the first middle section 48.

Preferably, the first wall 28a of the first rail 22 comprises a first supporting section K1 and a second supporting section K2 bent relative to the first supporting section K1. The second supporting section K2 is configured to hold the second extension section 46 of the second rail 26, in order to prevent the second rail 26 from being detached from the passage 32 of the first rail 22.

Preferably, the first middle wall 30 of the first rail 22 has a first surface S1 and a second surface S2 opposite to the first surface S1. The first surface S1 faces the second rail 26, or the first surface S1 is closer to the second rail 26 in contrast to the second surface S2. The first predetermined part 52 comprises a first shoulder section 54a, a second shoulder section 54b and a valley section 56 located between the first shoulder section 54a and the second shoulder section 54b. The shoulder sections 54a, 54b are protruded or raised relative to the first surface S1 of the first middle so as to enhance structural strength of the first rail 22 (the first middle wall 30 of the first rail 22), and further improve stability of the first rolling member 34 located between the first ball groove 40 and the second ball groove 50.

Preferably, the slide assisting device 24 further comprises a second rolling member 58. In the present embodiment, the second rolling member 58 is a ball, but the present invention is not limited thereto. Preferably, the retainer 35 is configured to mount the second rolling member 58. The first middle wall 30 of the first rail 22 is further arranged with a second predetermined part 74 bent relative to the first middle wall 30. For example, the second predetermined part 74 is substantially arranged in an arc shape. The second predetermined part 74 has third ball groove 60, and the second rail 26 further comprises a second extension wall 62. The second extension wall 62 comprises a third extension section 64, a fourth extension section 66 and a second middle section 68 connected between the third extension section 64 and the fourth extension section 66. The third extension section 64 is extended from the fourth wall 36b of the second rail 26. The second middle section 68 comprises a fourth ball groove 70. The second rolling member 58 is located between the third ball groove 60 and the fourth ball groove 70.

Preferably, the second predetermined part 74 is adjacent to the second wall 28b of the first rail 22. The second middle section 68 of the second rail 26 has an arc contour. In the present embodiment, the second rolling member 58 is in contact between the third ball groove 60 and the arc contour of the second middle section 68.

Preferably, the second wall 28b of the first rail 22 comprises a third supporting section K3 and a fourth supporting section K4 bent relative to the third supporting section K3. The fourth supporting section K4 is configured to hold the fourth extension section 66 of the second rail 26, in order to prevent the second rail 26 from being detached from the passage 32 of the first rail 22.

Preferably, the second predetermined part 74 comprises a first shoulder section 76a, a second shoulder section 76b and a valley section 78 located between the first shoulder section 76a and the second shoulder section 76b. The shoulder sections 76a, 76b are protruded or raised relative to the first surface S1 of the first middle wall 30, so as to enhance structural strength of the first rail 22 (the first middle wall 30 of the first rail 22), and further improve stability of the second rolling member 58 located between the third ball groove 60 and the fourth ball groove 70.

Moreover, the second rail 26 is usually configured to carry a carried object (not shown in figures), so that the carried object is subject to gravity. The first predetermined part 52 of the first rail 22 is bent relative to the first middle wall 30 to have a reinforcing effect, such that the entire structural strength or support strength of the first rail 22 (or the slide rail assembly 20) is improved; or, the first shoulder section 54a and the second shoulder section 54b of the first predetermined part 52 are protruded or raised relative to the first surface S1 of the first middle wall 30, so as to enhance the structural strength of the first rail 22 (the first middle wall 30 of the first rail 22), and further improve stability of the first rolling member 34 located between the first ball groove 40 and the second ball groove 50.

Similarly, the second predetermined part 74 of the first rail 22 is bent relative to the first middle wall 30 to have a reinforcing effect, such that the entire structural strength or support strength of the first rail 26 (or the slide rail assembly 20) is improved; or, the first shoulder section 76a and the second shoulder section 76b of the second predetermined part 74 are protruded or raised relative to the first surface S1 of the first middle wall 30 to be used as reinforcing ribs, so as to enhance the structural strength of the first rail 22 (the first middle wall 30 of the first rail 22), and further improve stability of the second rolling member 58 located between the third ball groove 60 and the fourth ball groove 70.

An embodiment of the present invention further provides a slide rail, such as the first rail 22. The first rail 22 has the aforementioned structural configuration. Please refer to the structural configuration and related descriptions of the first rail 22 shown in FIG. 2. For simplification, no further illustration is provided.

Therefore, the slide rail assembly 20 and the slide rail thereof (such as the first rail 22) provided by the embodiments of the present invention can have better structural strength or support strength through the aforementioned technical features.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
    a first rail comprising a first wall, a second wall and a first middle wall connected between the first wall and the second wall, a passage being defined by the first wall, the second wall and the first middle wall;
    a slide assisting device arranged in the passage of the first rail, and the slide assisting device comprising a first rolling member and a retainer configured to mount the first rolling member; and
    a second rail movable relative to the first rail, the second rail comprising a third wall, a fourth wall and a second middle wall connected between the third wall and the fourth wall;
    wherein the first middle wall of the first rail is arranged with a first predetermined part bent relative to the first middle wall, the first predetermined part is formed with a first ball groove, the second rail further comprises a first extension wall, the first extension wall comprises a first extension section, a second extension section and a first middle section connected between the first extension section and the second extension section, the first extension section is extended from the third wall of the second rail along a height direction of the slide rail assembly toward the first middle wall to be connected to the first middle section, the second extension section is extended from the first middle section along the height direction to be away from the first middle wall, and the first middle section is formed with a second ball groove;

wherein the first rolling member is located between the first ball groove and the second ball groove;

wherein the first wall of the first rail comprises a first predetermined section extended from the first middle wall along the height direction, a second predetermined section extended from the first predetermined section along a width direction of the slide rail assembly, a first supporting section extended from the second predetermined section along the height direction to be away from the first middle wall, and a second supporting section bent relative to the first supporting section to be extended from the first supporting section along the width direction, wherein the second extension section of the second rail is extended toward the second supporting section from the first middle section and configured to be held by the second supporting section;

wherein the height direction is perpendicular to the width direction;

wherein the first middle wall of the first rail has a first surface and a second surface opposite to each other; the first predetermined part is substantially in an arc shape and comprises a first shoulder section, a second shoulder section and a valley section located between the first shoulder section and the second shoulder section of the first predetermined part, and the first shoulder section and the second shoulder section of the first predetermined part are protruded relative to the first surface of the first middle wall;

wherein a predetermined extension portion of the first middle wall is extended from the first shoulder section along the width direction to be connected to the first predetermined section;

wherein the predetermined extension portion, the first predetermined section and the second predetermined section define an accommodation space configured to accommodate a lateral part of the retainer.

2. The slide rail assembly of claim 1, wherein the first surface is closer to the second rail than the second surface.

3. The slide rail assembly of claim 1, wherein the slide assisting device further comprises a second rolling member; wherein the first middle wall of the first rail is arranged with a second predetermined part bent relative to the first middle wall, the second predetermined part is formed with a third ball groove, the second rail further comprises a second extension wall, the second extension wall comprises a third extension section, a fourth extension section and a second middle section connected between the third extension section and the fourth extension section, the third extension section is extended from the fourth wall of the second rail, and the second middle section is formed with a fourth ball groove; wherein the second rolling member is located between the third ball groove and the fourth ball groove.

4. The slide rail assembly of claim 3, wherein the second wall of the first rail comprises a third supporting section and a fourth supporting section bent relative to the third supporting section, and the fourth supporting section is configured to hold the fourth extension section of the second rail.

5. The slide rail assembly of claim 4, wherein the second predetermined part is substantially in an arc shape and comprises a first shoulder section, a second shoulder section and a valley section located between the first shoulder section and the second shoulder section of the second predetermined part, and the first shoulder section and the second shoulder section of the second predetermined part are protruded relative to the first surface of the first middle wall.

6. A slide rail, comprising:
a first wall;
a second wall; and
a middle wall connected between the first wall and the second wall;
wherein the middle wall of the slide rail is arranged with a first predetermined part bent relative to the middle wall, and the first predetermined part is formed with a ball groove;
wherein the middle wall of the slide rail has a first surface and a second surface opposite to each other; the first predetermined part comprises a first shoulder section, a second shoulder section and a valley section located between the first shoulder section and the second shoulder section of the first predetermined part, and the first shoulder section and the second shoulder section of the first predetermined part are protruded relative to the first surface of the middle wall;
wherein the first wall comprises a first predetermined section extended from the middle wall along a height direction of the slide rail, a second predetermined section extended from the first predetermined section along a width direction of the slide rail, a first supporting section extended from the second predetermined section along the height direction to be away from the middle wall, and a second supporting section bent relative to the first supporting section to be extended from the first supporting section along the width direction;
wherein the height direction is perpendicular to the width direction;
wherein a predetermined extension portion of the middle wall is extended from the first shoulder section along the width direction to be connected to the first predetermined section.

7. The slide rail of claim 6, wherein the middle wall of the slide rail is further arranged with a second predetermined part bent relative to the middle wall, and the second predetermined part is formed with a ball groove; the second predetermined part comprises a first shoulder section, a second shoulder section and a valley section located between the first shoulder section and the second shoulder section of the second predetermined part, and the first shoulder section and the second shoulder section of the second predetermined part are protruded relative to the first surface of the middle wall.

* * * * *